United States Patent [19]
Nishimura

[11] 4,092,213
[45] May 30, 1978

[54] CONTROL ROD DRIVES FOR NUCLEAR REACTORS
[75] Inventor: Akira Nishimura, Hitachi, Japan
[73] Assignee: Hitachi, Ltd., Japan
[21] Appl. No.: 671,989
[22] Filed: Mar. 30, 1976
[30] Foreign Application Priority Data
Apr. 4, 1975 Japan .................................. 50-40254
[51] Int. Cl.² .............................................. G21C 7/14
[52] U.S. Cl. ..................... 176/36 R; 92/17; 92/33
[58] Field of Search ...................... 176/36 R; 92/17, 33

[56] References Cited
U.S. PATENT DOCUMENTS

| | | | |
|---|---|---|---|
| 3,020,887 | 2/1962 | Hobson et al. | 176/36 R |
| 3,020,888 | 2/1962 | Braun | 176/36 R |
| 3,031,397 | 4/1962 | Fortescue et al. | 176/36 R |
| 3,038,846 | 6/1962 | Yoemans et al. | 176/36 R |
| 3,154,472 | 10/1964 | Shannon | 176/36 R |

FOREIGN PATENT DOCUMENTS
1,950,646  4/1971  Germany .......................... 176/36 R Primary Examiner—Samuel W. Engle
Assistant Examiner—S. A. Cangialosi
Attorney, Agent, or Firm—Craig & Antonelli

[57] ABSTRACT

A control rod drive for a nuclear reactor which has an index tube coupling a control rod at one end and connecting a drive piston at the other end is adapted to vertically move the index tube by hydraulic pressure applied thereto. The index tube is formed with at least one helical groove on the outer surface and a plurality of recesses on the bottom surface of the helical groove. Collet fingers each having one end always urged against the index tube and the other end secured to a drive cylinder are provided for controlling the movement of the index tube. The collet fingers are able to engage with and disengage from the helical groove during rapid insertion of the control rod into a reactor core while able to slide in the helical groove during extraction of the control rod out of the core and to engage with the recess to prevent the movement of the control rod.

42 Claims, 8 Drawing Figures

CONTROL ROD DRIVES FOR NUCLEAR REACTORS

BACKGROUND OF THE INVENTION

The present invention relates to a control rod drive for a nuclear reactor.

A conventional nuclear reactor typically has a plurality of fuel assemblies located in a reactor core, said fuel assembly having fuel rods each of which is composed of a plurality of fuel elements of fissionable material and a clad tube containing the fuel elements therein and made of anticorrosion material of high thermal conductivity. The reactor core comprises the fuel assemblies spaced from each other and control elements in the form of a rod or plate disposed between the fuel assemblies, the control elements being able to insert thereinto and extract therefrom. The reactor core is contained in a vessel so that coolant flows through the core and between the vessel and the core.

Now, $^{235}U$ emits fast neutrons during its fission. As a nature of a neutron, it becomes easily absorbed by $^{235}U$ with decrease of speed of the neutron, promoting fission of $^{235}U$. The successive fission is called "sustaining reaction". The sustaining reaction is controlled by use of moderators for fast neutrons and control elements for absorbing neutrons. A power of the reactor is in proportion to the neutron density.

If under the presence of such moderators and control elements one neutron emitted by fission causes the next fission producing a certain average number of new neutrons, the ratio of the numbers between the old neutron and the new neutrons is called an "effective multiplication factor $k$". With $k = 1$, the nuclear reactor can continue fission without supply of neutrons, and thus this is called a "critical condition".

When it is required to increase the power of a nuclear reactor, the control elements are extracted out of the reactor core so as to increase the multiplication factor above 1, while when it is required to decrease the power the control elements are inserted into the core so as to decrease the factor below 1. In either case, as soon as the power reaches a desired level, the control elements are moved to the position where the reactor is in a critical condition.

When an accident to a nuclear reactor occurs, the control elements are rapidly inserted into the core. In this case, there is no danger of rapidly cooling fuel elements and clad tubes even if the power decreases rapidly, because the reactor core has a sufficient heat capacity. Therefore, no adverse thermal effect due to the rapid insertion of control elements occurs.

On the other hand, if the control elements are rapidly extracted out of the core, the neutron density in the reactor core increases rapidly and the power also increases rapidly, which leads to deformation of fuel elements and clad tubes and interference therebetween due to the deformation, which further results in break down of the fuel elements and clad tubes and leakage of neutrons out of the reacter core which causes radioactive contamination.

A conventional control rod drive comprises a hydraulically driven piston and an index tube connected at one end with the piston and coupled at the other end with a control rod. The index tube is formed with a plurality of ringed grooves of equal pitch on the outer circumferential surface thereof. These ringed grooves cooperate with collet fingers which are constructed to be urged against the index tube and have means for enabling the collet fingers to engage with or disengage from the ringed grooves during movement of the index tube in the longitudinal direction thereof. The ringed grooves and collet fingers are shaped such that the collet fingers are able to disengage from the groove with ease when the index tube is moved toward the core, while the collet fingers lock the index tube preventing downward movement thereof when the index tube is moved in the opposite direction from the core.

When a control rod is inserted into the reactor core, the piston is driven toward the core and the collet fingers disengage from the ringed grooves and then engage with the next adjacent ringed grooves. This motion is repeated with the collet fingers sliding on the index tube. Therefore, it is possible to insert the control rod rapidly into the core for one pitch or notch of the ringed grooves or for several notches.

When the control rod is extracted out of the core, the index tube is moved toward the core for about half a notch disengaging the collet fingers out of the ringed grooves, so that the collet fingers contact the outer circumferential surface of the index tube. The collet fingers are in turn separated from the index tube by the collet finger separating means and then the index tube is driven in the reverse direction to the core for about one and half a notches. Thereafter, the collet fingers are released from the separating means and put on the index tube in engagement with the next ringed grooves.

It should be noted that there is a limitation in driving speed of the index tube because of a hydraulic mechanism for driving the piston and it is about 15 cm/sec at slowest. For this reason, the linear power density of the fuel rods located adjacent to the tips of the control rods increases about 10 KW/ft. This results in producing various drawbacks. In order to overcome this problem, an attempt has been made where the length of a notch of the grooves is shortened to increase engaging time. However, this has not been practical because it makes control rod extracting operations very complicated and maintenance very hard.

SUMMARY OF THE INVENTION

Accordingly, it is an object of the present invention to provide a control rod drive which is able to extract a control rod out of a reactor core without rapid increase in power of a nuclear reactor.

It is another object of the present invention to provide a control rod drive which is simple in operation of extracting a control rod out of a reactor core and is easy in maintenance.

The present invention provides a control rod drive for a nuclear reactor including an index tube having one end connected to a drive piston and the other end adapted to couple with a control rod, the index tube being vertically moved by pressurized fluid applied to the drive piston. The index tube is formed with at least one helical groove on an outer circumferential surface thereof. The control rod drive also has collet fingers each having one end secured to a drive cylinder and the other end urged by its own resiliency against the index tube and engageable with the helical groove of the index tube. The collet fingers are incorporated with the helical groove of the index tube so that the index tube is slowly moved during extraction of the control rod from a reactor core while rapidly movable during insertion of the control rod into the reactor core.

DETAILED DESCRIPTION OF THE PREFERRED EMBODIMENTS

Figure 1:
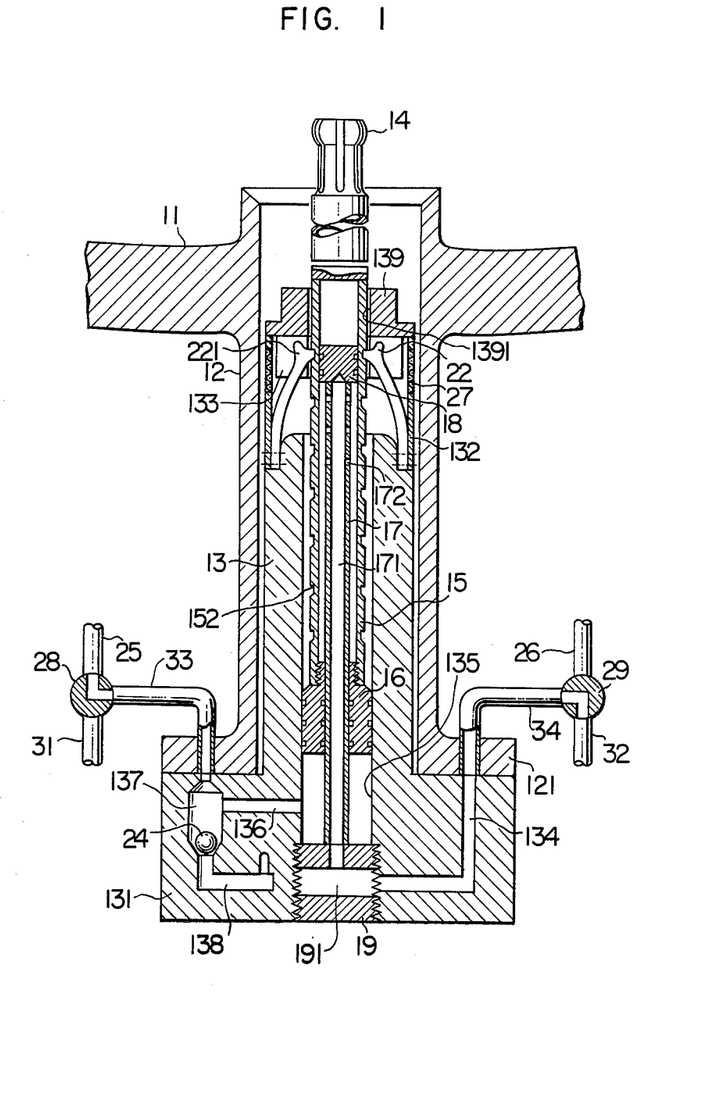
FIG. 1 is a sectional view of a preferred embodiment of the invention showing a general construction thereof.

Referring to FIG. 1, a control rod drive for a nuclear reactor of a preferred embodiment of the present invention generally includes a cylindrical housing 12, a drive cylinder 13, an index tube 15, a drive piston 16, a piston tube 17 and a pair of collet fingers 22.

The cylindrical housing 12 extends downwardly from the bottom of a reactor vessel 11 and has a flange 121 at its lower end. The drive cylinder 13 has a massive part 131 at its lower end and is inserted in the housing from the lower end thereof, with the massive part being securely connected with the flange 121 of the housing. A main portion of the drive cylinder 13 is concentrically disposed in the housing apart from the wall of the housing 12. The drive cylinder 13 also has a longitudinally extending bore 135 therethrough.

The index tube 15 is concentrically disoposed in the bore 135 of the drive cylinder 13 apart therefrom and the piston tube 17 is concentrically disposed in the interior of the index tube 15 apart therefrom.

The drive piston 16 is secured at the lower end of the index tube 15 and has an outer circumferential surface slidable on the bore surface of the drive cylinder 13 and an inner circumferential surface slidable on the piston tube 17 simultaneously with the slide of the outer surface of the drive piston 16.

The index tube 15 has double helical grooves 152 of a trapezoidal cross-section on its outer circumferential surface. Each the helical groove 15 has a plurality of recesses 153 therein which are spaced an equal distance from each other along a longitudinal direction of the index tube 15.

Figure 4:
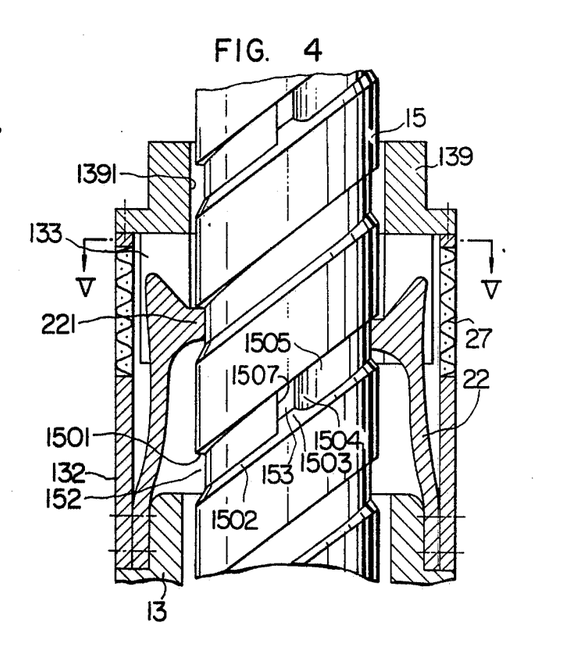
FIG. 4 is an enlarged fragmentary sectional view of a main part of the embodiment shown in FIG. 1.

As shown in FIG. 4, the helical groove 152 of a trapezoidal cross-section is defined by a bottom surface 1505 and opposed side surfaces 1501 and 1502 along the bottom surface. The side surface 1501 on the core side of the helical groove 152 is in a right-angle with respect to a longitudinal axis of the index tube 15 and the side surface 1502 on the opposite side is inclined with respect to the longitudinal axis of the index tube. The recess 153 has opposed side surfaces 1504 and 1507 and opposed end surfaces 1503 and 1506. The side surface 1504 on the right side of FIG. 4 is inclined with respect to a plane perpendicular to the plane of the drawing and including the longitudinal axis of the index tube 15 and preferably gently curved and contiguous with the bottom surface 1505 of the helical groove 152. The other side surface 1507 is in the plane perpendicular to the drawing and including the longitudinal axis of the index tube 15. The end surface 1503 opposite the core side of the recess is inclined with respect to the longitudinal axis of the index tube 15 and forms an extension of the inclined side surface 1502 of the groove 152. The other end surface 1506 on the opposite side is in a right-angle with respect to the longitudinal axis and forms an extension of the side surface 1501 of the groove 152.

Attached to the upper end of the index tube 16 is a coupling spud 14, which protrudes into the interior of the reactor vessel 11 and is adapted to couple with the lower end of a control rod.

A stop piston 18 is secured to the upper end of the piston tube 17 is received in the index tube 15 so that the index tube is slidably movable on the stop piston 18. The piston tube 17 is formed with a plurality of through-holes 172 in a portion adjacent the stop piston 18. The piston tube 17 has at its lower end a plug 19 secured thereto, which is screwed to the massive part 131 of the drive cylinder 13 so as to close the lower opening of the bore 135 thereof.

The massive part 131 of the drive cylinder 13 is formed with water passages 134, 136 and 138 and a water box 137 having a ball check valve 24 therein. The plug 19 is formed with a water passage 191 which communicates the passage 134 in the massive part 131 to the interior 171 of the piston tube 17.

The collet fingers 22 are provided on the upper end of the drive cylinder 13, with one end of each the fingers being secured to the upper end of the cylinder 13. The other end of each the collet fingers 22 forms a pawl 221, which is urged by its own resiliency against the index tube 17 and engageable with the helical groove 152 and being lockable in the recess 153. A cylindrical cover tube 132 is secured at its one end to the upper end of the drive cylinder 13 encircling the collet fingers 22. The cover tube 132 is provided with a mesh filter 27 covering the upper portion thereof.

A guide cap 139 with a bore 1391 is secured to the other end of the cover tube 132, with the index tube 15 extending through the bore 1391. The clearance between the bore 1391 and the index tube 15 is sealed by use of a carbon ring (not shown). As more clearly shown in FIG. 5, in order to hold the collet fingers 22 in position, there is provided a two-part ring spacer 133 downwardly extending from the guide cap 139, with the upper portion of each the collet fingers 22 being inserted between halves of the ring spacer 133 so as to prevent the collet fingers 22 from moving circumferentially.

The drive piston 16 is driven by pressurized water. For this purpose, there are provided a first conduit means which includes a first three-way valve 28 and a second conduit means which includes a second three-way valve 29. The first three-way valve 28 has a first drive water inlet 25 communicating to a drive water supply source (not shown), a first drive water outlet 31 communicating to a low pressure section (not shown) and a first drive water passage 33 communicating to the water box 137 in the massive part 131 through the flange 121 of the casing 12. The second three-way valve 29 has a second drive water inlet 26 communicating to a drive water supply source (not shown), a second drive water outlet 32 communicating to a low pressure section (not shown) and a second drive water passage 34 communicating to the passage 134 in the massive part through the flange 121.

When the first three-way valve 28 is in supply position and the second three-way valve 29 is in discharge position, pressurized water is supplied through the first inlet 25, the first three-way valve 28 and the first passage 33 to the water box 137 and then through the passage 136 into the bore 135, while pressurized water in the interior 171 of the piston tube 17 is discharged through the passage 191 in the plug 19 and the passage 134 in the massive part 131 to the passage 34 and then through the second three-way valve 29 into the second outlet 32. When the first three-way valve 28 is in discharge position and the second three-way valve 29 is in supply position, pressurized water is supplied through the second inlet 26, the second three-way valve 29 and the second passage 34 into the passage 134 and then through the passage 191 into the interior 171, while pressurized water in the bore is discharged through the passage 136 and the water box 137 into the first passage 33 and then through the first three-way valve 28 into the first outlet 31.

The passage 138 in the massive part 131 is in communication with the reactor core for introducing pressurized water therein to the water box 137 when an accident occurs to the first conduit means during rapid insertion of a control rod into the core. When the pressure in the first conduit means is lowered by an accident during rapid control rod insertion, the ball check valve 24 is moved to an open position by pressurized water in the passage 138 and thus pressurized water in the core is supplied to the water box 137 as a drive water instead of those in the first conduit means, thereby permitting emergency stop of operation of the reactor. It should be noted that this auxiliary conduit means is provided in view of great importance of ensuring rapid insertion of a control rod into the reactor core, and therefore no such means is provided for the second conduit means which is not used for rapid control insertion.

In addition, lead switches (not shown) are provided in the piston tube 17 for detecting position of the drive piston 16 at each movement thereof by half a distance between the recesses 153. Also, a timer (not shown) is set to associate with the first three-way valve 28 and the second three-way valve 29 for controlling initial operation of control rod extraction.

Figure 2:
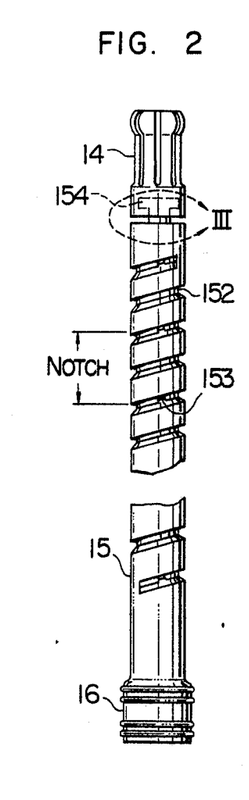
FIG. 2 is a view of an index tube of an alternate embodiment of the present invention.

In FIG. 2, there is shown a main part of an alternate embodiment of the present invention in which the index tube 15 is formed with a single helical groove 152 therein. With the single helical groove 152, only one collet finger 22 or a pair of collet fingers 22 vertically shifted to each other is provided instead of the opposed pair of collet fingers 22 shown in FIG. 1. A recess 153 is formed in the groove 152 at each two pitches or notches of the groove 152.

Figure 3:
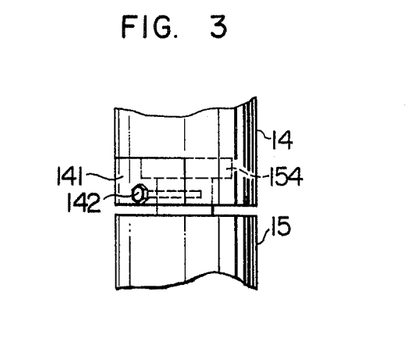
FIG. 3 is an enlarged view of a portion III shown in FIG. 2.

FIG. 3 illustrates in detail a portion III in FIG. 2. The coupling spud 14 is connected with a coupling 154 protruding from the index tube 15 so as not to rotate together with index tube 15. The coupling of the spud 14 has a half 141 divided therefrom. The half 141 is fastened to the coupling spud 14 by a bolt 142 after the coupling 154 is inserted in the spud 14.

Now, operation of the embodiment shown in FIG. 1 is explained hereinunder.

(1) Rapid Insertion of Control Rod

Referring to FIG. 1, the first three-way valve 28 is set in supply position to communicate between the first drive water inlet 25 and the water box 137 and the second three-way valve 29 is set in discharge position to communicate between the passage 134 and the second drive water outlet 32. Drive water is supplied through the first inlet 25, the valve 28, the passage 33, the water box 137 and the passage 136 into the bore 135 on the opposite side of the drive piston 16 to the reactor core, thereby forcing the drive piston 16 and thus the index tube 15 upwardly.

Figures 5, 6, 7:
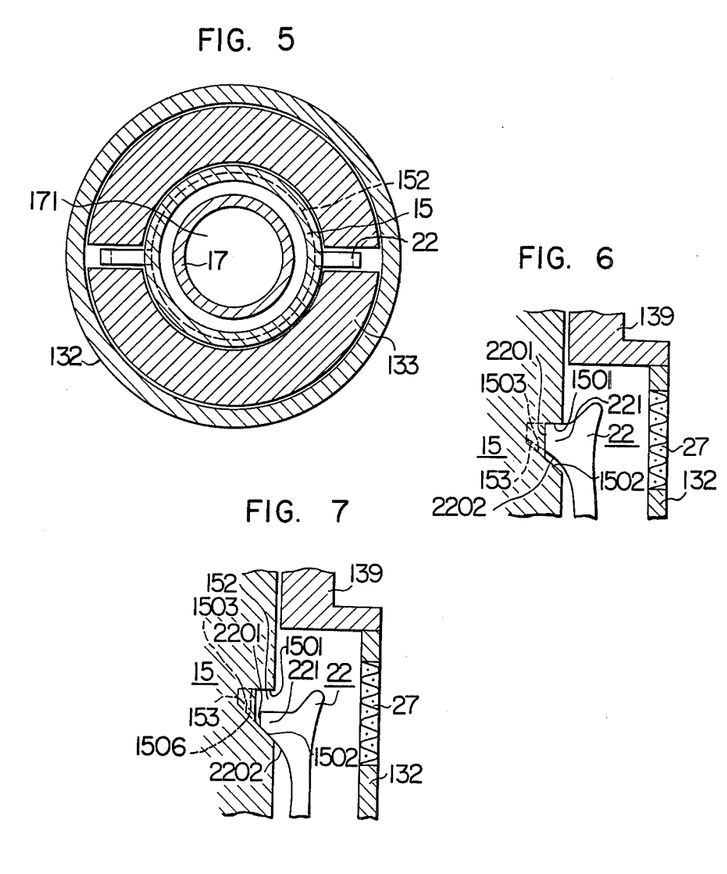
FIG. 5 is a transverse sectional view taken substantially along line V—V of FIG. 4.
FIG. 6 is an enlarged fragmentary sectional view showing collet fingers in engagement with a recess in accordance with the present invention.
FIG. 7 is an enlarged fragmentary sectional view showing collet fingers and a recess which are being released from engagement with each other.

Referring to FIGS. 6 and 7, when the index tube 15 is moved upwardly, the pawl 221 of each the collet fingers 22 in engagement with the helical groove 152 or recess 153 is released from the engagement as the pawl 211 is able to slide on the inclined surface 1502 and/or 1503 while the inclined surface 1502 presses the pawl 221 outwardly by a cam action. Thereafter, the pawl 221 slides on the outer circumferential surface of the index tube 15 and engages in turn the next adjacent groove 152. This is repeated and the index tube 15 is continuously lifted. If desired, the index tube 15 can be stopped at an appropriate position by controlling the first three-way valve 28.

Referring again to FIG. 1, during the upward movement of the index tube 15, pressurized water between the index tube 15 and the piston tube 17 is discharged through the openings 172, the interior 171 of the piston tube 17, the passages 191, 134 and 34, the valve 29 and the second outlet 32 into the low pressure section.

Accordingly, the index tube 15 permits a control rod coupled therewith to insert rapidly to a desired position in the reactor core. When an accident to the first conduit means occurs, pressurized water from the reactor core is supplied through the passage 138 and the ball check valve 24 into the water box 137, thereby permitting rapid insertion of a control rod in the same manner as explained as to the first conduit means.

(2) Extraction of Control Rod

The first and second three-way valves 28 and 29 are set in the same manner as the case of the control rod insertion. Referring to FIGS. 6 and 7 particularly, the index tube 15 is slightly moved upwardly by controlled operation of the above described timer at first, so that the pawl 221 of each the collet fingers 22 in engagement with the recess 153 slides on the inclined surface 1503 while outwardly pressed thereby. When the tip of the pawl 221 comes to the inclined surface 1502 of the helical groove 152 as shown in FIG. 7, the first three-way valve 28 actuates to communicate between the water box 137 and the first outlet 31, while the second three-way valve 29 actuates to communicate the drive water inlet 26 and the passage 134. Therefore, pressurized water from the inlet 26 is supplied through the passages 34, 134 and 191 into the interior 171 of the piston tube 17 and then through the openings 172 into between the index tube 15 and the piston tube 17, thereby forcing the drive piston 16 and thus the index tube 15 downwardly.

In FIG. 4, the downward movement of the index tube 15 causes contact of the pawl 221 of each the collet fingers 22 with the side surface 1501 which is in right-angle with respect to the longitudinal axis of the index tube 15, which contact causes rotation of the index tube 15 about the longitudinal axis and permits the pawl 221 to rest on the inclined surface 1504 of the recess 153. The pawl 221 in turn slides on the bottom surface 1505 and the side surface 1501 of the helical groove 152 while causing rotation of the index tube 15.

When the index tube 15 is moved downwardly one pitch or notch with rotation, the pawl 221 of each the collet fingers 22 engages the next adjacent recess 153. Thereafter, the above mentioned operation is repeated and therefore, the index tube 15 and thus a control rod is slowly extracted.

Figure 8:
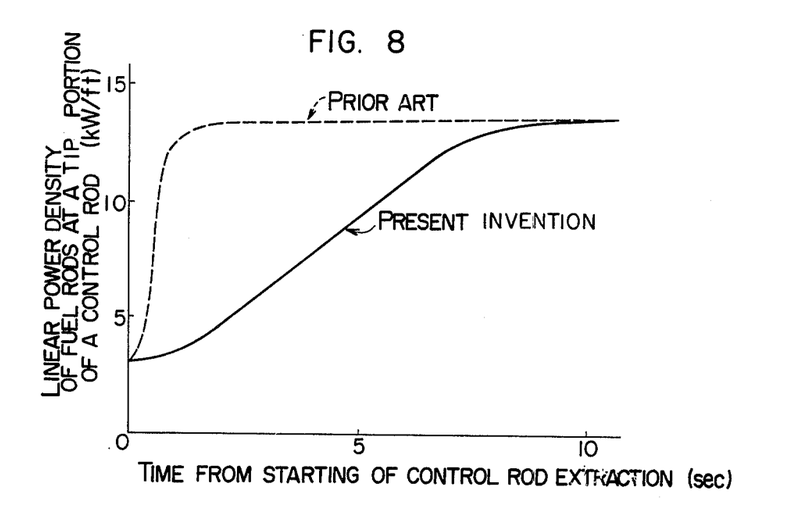
FIG. 8 is a graph showing a relation between a control rod extracting time and a linear power density of fuel rods in a region of a tip portion of a control rod.

FIG. 8 shows variation of power of fuel rods in the region of the tip portions of control rods during extraction of the control rods, comparing the present invention and the prior art. In the graph, the broken line shows the prior art and the solid line shows the present invention.

It will be noted from the graph that linear power density of fuel rods at the starting of control rod extraction is 3KW/ft and it becomes 13 KW/ft about one second later with increase of 10 KW/ft in the prior art, while in accordance with the present invention the linear power density reaches 13 KW/ft ten seconds later due to reduction in speed of control rod extraction to one tenth of that of the prior art. Therefore, the present invention permits reduction of the degree of increase of the linear power density to one tenth of that of the prior art, which leads to the safety driving of control rods.

In addition, the control rod drive in accordance with the present invention does not need a special mechanism for separating the collet fingers 22 from the index tube 15 and holding them with the guide cap 139 and means for moving the collet fingers 22 in the longitudinal direction of the index tube 15 which have been provided to the prior art. Therefore, operation and maintenance of the control rod drive in accordance with the present invention are very simple and easy.

Although the pressurized fluid has been described as water in its preferred form, it is to be understood that the fluid is not limited to water and other liquids and inert gases can be utilized therefor unless they adversely affect the reactor water. It is further to be understood that the supply and discharge conduit means for pressurized water are not limited to the system in which fluid flows through the passages formed through the flange 121 of the housing 12 and in the massive part 131 of the drive cylinder 13 and another system can be used therefor.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A control rod drive for insertion and extraction of a control rod into and out of a core of a nuclear reactor comprising:
   means for converting fluid pressure into a reciprocal movement thereof,
   a drive rod of a cylindrical shape having at least one helical groove on an outer circumferential surface thereof for transmitting said reciprocal movement of said converting means to the control rod, and
   collet fingers urged against said drive rod and engageable with said helical groove of said drive rod, said helical groove and said collet fingers being shaped such that said drive rod is slowly moved during extraction of the control rod out of the core while rapidly movable during insertion of the control rod into the core,
   wherein said helical groove has a plurality of recesses therein for engagement with and locking of said collet fingers.

2. A control rod drive for insertion and extraction of a control rod into and out of a core of a nuclear reactor comprising:
   a piston reciprocally movable by fluid under pressure,
   a drive rod having at least one helical groove on an outer circumferential surface thereof for transmitting a reciprocal movement of said piston to the control rod, and
   collet fingers urged against said drive rod and engageable with said helical groove of said drive rod, said helical groove and said collet fingers being shaped such that said drive rod is slowly moved during extraction of the control rod out of the core while rapidly movable during insertion of the control rod into the core,
   wherein said helical groove has a plurality of recesses therein for engagement with and locking of said collet fingers.

3. A control rod drive for insertion and extraction of a control rod into and out of a core of a nuclear vessel comprising:
   a cylindrical housing extending from said nuclear reactor vessel,
   a drive cylinder inserted in said housing and having a portion secured to said housing on the opposite side thereof to the core, said drive cylinder having a longitudinally extending bore therethrough,
   a plug cloging said cylinder bore on the opposite side thereof to the core and having a fluid passage with one opening toward said cylinder bore,
   a drive piston having an outer circumferential surface slidable on a surface of said cylinder bore and an inner circumferential slide surface concentrical with said outer surface,
   an index tube disposed concentrically in said cylinder bore and having one end secured to said drive piston on the opposite side thereof to the core and the other end adapted to couple with the control rod, said index tube having at least one helical groove on an outer circumferential surface thereof and a plurality of recesses in said helical groove,
   a stop piston disposed in said index tube and having an outer circumferential surface on which said index tube is slidable,
   a piston tube having one end connected with said stop piston on the core side and the other end secured to said plug and surrounding said one opening of said plug passage, said inner surface of said drive piston being slidable on an outer circumferential surface of said piston tube, said piston tube having a plurality of through-holes located adjacent said one end thereof,
   collet fingers having one end secured to said drive cylinder and the other end forming a pawl urged by its own resiliency against said index tube and engageable with said helical groove of said index tube,
   a cover tube encircling said collet fingers and having one end secured to said drive cylinder and the other end provided with a mesh filter, a guide cap connected with the other end of said cover tube and having a bore through which said index tube extends, a first pressurized fluid feed means for feeding pressurized fluid into said cylinder bore on the opposite side of said drive piston to the core, a second pressurized fluid feed means for feeding pressurized fluid into the other opening of said plug passage, a first change-over means operable between a feed position where pressurized fluid is fed to said cylinder bore on the opposite side of said drive piston to the core and a discharge position where pressurized fluid fed to said cylinder bore is discharged therefrom, and a second change-over means operable between a feed position where pressurized fluid is fed to the other opening of said plug passage and a discharge position where pressurized fluid fed to the other opening is discharged therefrom.

4. A control rod drive for insertion and extraction of a control rod into and out of a core of a nuclear reactor vessel comprising:

a cylindrical housing extending from said nuclear reactor vessel, a drive cylinder inserted in said housing and having a portion secured to said housing on the opposite side thereof to the core, said drive cylinder having a longitudinally extending bore therethrough, a plug cloging said cylinder bore on the opposite side thereof to the core and having a fluid passage with one opening toward said cylinder bore, a drive piston having an outer circumferential surface slidable on a surface of said cylinder bore and an inner circumferential slide surface concentrical with said outer surface, an index tube disposed concentrically in said cylinder bore and having one end secured to said drive piston on the opposite side thereof to the core and the other end adapted to couple with the control rod, said index tube having at least one helical groove on an outer circumferential surface thereof and a plurality of recesses in said helical groove, a stop piston disposed in said index tube and having an outer circumferential surface on which said index tube is slidable, a piston tube having one end connected with said stop piston on the core side and the other end secured to said plug and surrounding said one opening of said plug passage, said inner surface of said drive piston being slidable on an outer circumferential surface of said piston tube, said piston tube having a plurality of through-holes in the region adjacent said one end thereof, collet fingers having one end secured to said drive cylinder and the other end forming a pawl urged by its own resiliency against said index tube and engageable with said helical groove of said index tube, a cover tube encircling said collet fingers and having one end secured to said drive cylinder and the other end provided with a mesh filter, a guide cap connected with said the other end of said cover tube and having a bore through which said index tube extends, a first pressurized fluid passage for feeding pressurized fluid into said cylinder bore on the opposite side of said drive piston to the core, a second pressurized fluid passage for feeding pressurized fluid into the other opening of said plug passage, a first three-way valve operable between a feed position where pressurized fluid is fed to said cylinder bore on the opposite side of said drive piston to the core and a discharge position where said pressurized fluid fed to said cylinder bore is discharged therefrom, and a second three-way valve operable between a feed position where pressurized fluid is fed to the other opening of said plug passage and a discharge position where said pressurized fluid fed to the other opening is discharged therefrom.

5. A control rod drive according to claim 3, wherein said plurality of recesses are respectively disposed at the bottom surface of said helical groove.

6. A control rod drive according to claim 5, wherein said helical groove has a cross-sectional profile including a first side surface disposed in the direction toward the core and being at right angles with respect to the longitudinal axis of said drive rod, a second side surface disposed away from said core and being inclined away from said core with respect to said longitudinal axis, and said bottom surface being approximately parallel with said longitudinal axis.

7. A control rod drive according to claim 6, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helical groove.

8. A control rod drive according to claim 7, wherein each one of said recesses is disposed in alternate pitches of said helical groove in the direction of said longitudinal axis.

9. A control rod drive according to claim 8, wherein said collet fingers includes a pawl member being engageable with said helical groove and lockable in said recesses, said pawl member having a cross-sectional profile with a first edge surface corresponding to said first side surface of said helcial groove and a second edge surface corresponding to said second side surface of said helical groove.

10. A control rod drive according to claim 1, wherein said helical groove has a cross-sectional profile including a first side surface disposed in the direction toward the core and being at right angles with respect to the longitudinal axis of said drive rod, a second side surface disposed away from said core and being inclined away from said core with respect to said longitudinal axis, and a bottom surface being approximately parallel with said longitudinal axis.

11. A control rod drive according to claim 10, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helcial groove.

12. A control rod drive according to claim 10, wherein said collet fingers includes a pawl member being engageable with said helical groove and lockable in said recesses, said pawl member having a cross-sectional profile with a first edge surface corresponding to said first side surface of said helical groove and a second edge surface corresponding to said second side surface of said helical groove.

13. A control rod drive according to claim 1, wherein each one of said recesses in disposed in alternate pitches of said helical groove in the direction of said longitudinal axis.

14. A control rod drive according to claim 2, wherein said plurality or recesses are respectively disposed at the bottom surface of said helical groove.

15. A control rod drive according to claim 14, wherein said helical groove has a cross-sectional profile including a first side surface disposed in the direction toward the core and being at right angles with respect to the longitudinal axis of said drive rod, a second side surface disposed away from said core and being inclined away from said core with respect to said longitudinal axis, and said bottom surface being approximately parallel with said longitudinal axis.

16. A control rod drive according to claim 15, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helical groove.

17. A control rod drive according to claim 16, wherein each one of said recesses is disposed in alternate pitches of said helical groove in the direction of said longitudinal axis.

18. A control rod drive according to claim 17, wherein said collet fingers includes a pawl member being engageable with said helical groove and lockable in said recesses, said pawl member having a cross-sectional profile with a first edge surface corresponding to said first side surface of said helical groove and a second edge surface corresponding to said second side surface of said helical groove.

19. A control rod drive according to claim 2, wherein said helical groove has a cross-sectional profile including a first side surface disposed in the direction toward the core and being at right angles with respect to the longitudinal axis of said drive rod, a second side surface disposed away from said core and being inclined away from said core with respect to said longitudinal axis, and a bottom surface being approximately parallel with said longitudinal axis.

20. A control rod drive according to claim 19, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helical groove.

21. A control rod drive according to claim 19, wherein said collet fingers includes a pawl member being engageable with said helical groove and lockable in said recesses, said pawl member having a cross-sectional profile with a first edge surface corresponding to said first side surface of said helical groove and a second edge surface corresponding to said second side surface of said helical groove.

22. A control rod drive according to claim 2, wherein each one of said recesses is disposed in alternate pitches of said helical groove in the direction of said longitudinal axis.

23. A control rod drive according to claim 3, wherein said collet fingers are engageable and lockable in said plurality of recesses.

24. A control rod drive according to claim 23, wherein each one of said recesses in disposed in alternate pitches of said helical groove in the direction of the longitudinal axis of said index tube.

25. A control rod drive according to claim 24, wherein said plurality of recesses are respectively disposed at the bottom surface of said helical groove.

26. A control rod drive according to claim 25, wherein said helical groove has a cross-sectional profile including a first side surface disposed in the direction toward the core and being at right angles with respect to the longitudinal axis of said index tube, a second side surface disposed away from said core and being inclined away from said core with respect to said longitudinal axis, and said bottom surface being approximately parallel with said longitudinal axis.

27. A control rod drive according to claim 26, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helical groove.

28. A control rod drive according to claim 27, wherein said collet fingers includes a pawl member being engageable with said helical groove and lockable in said recesses, said pawl member having a cross-sectional profile with a first edge surface corresponding to said first side surface of said helical groove and a second edge surface corresponding to said second side surface of said helical groove.

29. A control rod drive according to claim 3, wherein said first pressurized fluid feed means includes means for introducing pressurized fluid from the reactor core into said cylinder bore upon interruption of feeding of said pressurized fluid by said first feed means, said introducing means including check valve means.

30. A control rod drive according to claim 4, wherein said collet fingers are engageable and lockable in said plurality of recesses.

31. A control rod drive according to claim 30, wherein each one of said recesses is disposed in alternate pitches of said helical groove in the direction of the longitudinal axis of said index tube.

32. A control rod drive according to claim 31, wherein said plurality of recesses are respectively disposed at the bottom surface of said helical groove.

33. A control rod drive according to claim 32, wherein said helical groove has a cross-sectional profile including a first side surface disposed in the direction toward the core and being at right angles with respect to the longitudinal axis of said index tube, a second side surface disposed away from said core and being inclined away from said core with respect to said longitudinal axis, and said bottom surface being approximately parallel with said longitudinal axis.

34. A control rod drive according to claim 33, wherein each of said recesses has a cross-sectional profile including a first side surface extending in the direction of said longitudinal axis and being in a plane perpendicular to said longitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surface of said helical groove.

35. A control rod drive according to claim 34, wherein said collet fingers includes a pawl member being engageable with said helical groove and lockable in said recesses, said pawl member having a cross-sectional profile with a first edge surface corresponding to said first side surface of said helical groove and a second edge surface corresponding to said second side surface of said helical groove.

36. A control rod drive according to claim 4, further comprising a third pressurized fluid passage for feeding pressurized fluid from the reactor core upon interruption of feeding said pressurized fluid by said first fluid passage, wherein said third fluid passage includes a one-way check valve operable upon said interruption.

37. A control rod drive for insertion and extraction of a control rod into and out of a nuclear reactor core, said drive comprising first means for transmitting reciprocal movement to a control rod, said first means including a cylindrical member having at least one helical groove on the outer circumferential surface of said cylindrical member, second means for reciprocally driving said cylindrical member in a first direction toward the reactor core and in a second direction away from the reactor core, third means for elastically engaging said helical groove, said third means including pawl means being releasable from said helical groove when said cylindrical member is driven in said first direction and rotatingly moving said cylindrical member by engagement with said helical groove when said cylindrical member is driven in said second direction, and fourth means including a plurality of recesses in said helical groove for preventing rotational movement of said cylindrical member upon a predetermined rotation of said cylindrical member, thereby interrupting movement of said cylindrical member in said second direction.

38. A control rod drive according to claim 37, further comprising fifth means associated with said helical groove for releasing said pawl means from said fourth means, wherein said plurality of recesses are disposed at respective bottom surfaces of said helical groove, each of said recesses having a configuration for engaging at least a portion of said pawl means in said direction of rotation upon completing said predetermined rotation of said cylindrical member.

39. A control rod drive according to claim 37, wherein said plurality of recesses are disposed at respective bottom surfaces of said helical groove, each of said recesses having a configuration for engaging at least a portion of said pawl means in said direction of rotation upon completing said predetermined rotation of said cylindrical member.

40. A control rod drive according to claim 39, wherein each one of said recesses is disposed in alternate pitches of said helical groove in the direction of elongation of said cylindrical member.

41. A control rod drive according to claim 39, wherein said helical groove has a cross-sectional profile including a first side surface disposed in said first direction and being at right angles with respect to the longitudinal axis of said cylindrical member, a second side surface disposed in said second direction and being inclined in said second direction with respect to said longitudinal axis, and said bottom surface being approximately parallel with said longitudinal axis.

42. A control rod drive according to claim 41, wherein each of said recesses has a cross-sectional profile including a first side surface extending in the direction of said longitudinal axis and being in a plane perpendicular to said londitudinal axis to be approximately perpendicular to said bottom surface of said helical groove, a second side surface opposing said first side surface of said recess and being inclined with respect to said plane perpendicular to said longitudinal axis to join with said bottom surface of said helical groove, and first and second opposing end surfaces respectively contiguous with said first and second side surfaces of said helical groove.

* * * * *